United States Patent [19]

Geyken et al.

[11] 4,081,816
[45] Mar. 28, 1978

[54] APPARATUS FOR PROCESSING PHOTOGRAPHIC FILM AND TREATING CONTAMINATED PROCESSING LIQUIDS

[75] Inventors: Erwin Geyken; Peter Dawidowitsch, both of Munich, Germany

[73] Assignee: AGFA-Gevaert, A.G., Leverkusen, Germany

[21] Appl. No.: 530,049

[22] Filed: Dec. 5, 1974

[30] Foreign Application Priority Data

Dec. 7, 1973 Germany .................. 2361151

[51] Int. Cl.² .......................................... G03D 3/02
[52] U.S. Cl. ............................. 354/324; 204/109; 210/60; 210/105; 354/297
[58] Field of Search ............... 354/297, 319, 320, 321, 354/322, 323, 324; 134/64 P, 109, 122 P; 210/60, 105, 127; 96/63; 204/109

[56] References Cited
U.S. PATENT DOCUMENTS

| 1,319,026 | 10/1919 | Ybarrondo | 354/321 |
| 1,656,522 | 1/1928 | Josepho | 134/64 P |
| 1,962,306 | 6/1934 | Hickman | 96/61 X |
| 2,073,664 | 3/1937 | Weisberg et al. | 96/63 X |
| 2,419,853 | 4/1947 | Pask | 354/319 X |
| 3,528,358 | 9/1970 | Pickard | 354/323 X |
| 3,712,204 | 1/1973 | Aelterman | 354/324 |
| 3,733,994 | 5/1973 | Armstrong et al. | 354/324 X |
| 3,832,730 | 8/1974 | Geyken et al. | 354/319 X |

OTHER PUBLICATIONS

West, L. E. "In Support of Clean Water–Disposing of Effluents from Film Processing" Kodak pub. J-44, pp. 1-11, Oct. 1974, and earlier.
Dagon, T. J. "The Biological Treatment of Photographic Processing Effluents" Kodak pub. J-46, pp. 1-20, Sept. 1972.

Primary Examiner—Fred L. Braun
Attorney, Agent, or Firm—Michael J. Striker

[57] ABSTRACT

An arrangement for developing latent images includes a mechanism for conveying an article which carries a latent image over a succession of containers which accommodate a developer, a washing fluid, a fixer and a washing fluid, respectively. A pressure chamber is arranged above each container and the article passes through the pressure chambers. A pump is associated with each pressure chamber and pumps the respective fluid therein for contact with the article. A sensing device located at an upstream end of the arrangement senses the length of the article and causes a quantity of fresh developer to be admitted into the container with the developer. Concomitantly, a corresponding amount of contaminated developer flows out of the container and into a collecting vessel. The sensing device activates a source of chemical neutralizing fluid and causes a quantity of the latter to be admitted into the collecting vessel for neutralizing the contaminated developer. The container with the fixing bath is connected with a chamber which is provided with a pair of electrodes and the sensing device is also effective for causing current to be supplied to the electrodes so as to permit regeneration of contaminated fixer. The sensing device is further operative for causing a quantity of fresh washing fluid to be admitted into the downstream washing bath, which latter is in communication with the upstream washing bath. The downstream washing bath is provided with an outflow conduit so that, when the level in the washing bath exceeds a predetermined level, contaminated washing fluid flows out of the downstream washing bath and into the same collecting vessel as the contaminated developer.

4 Claims, 1 Drawing Figure

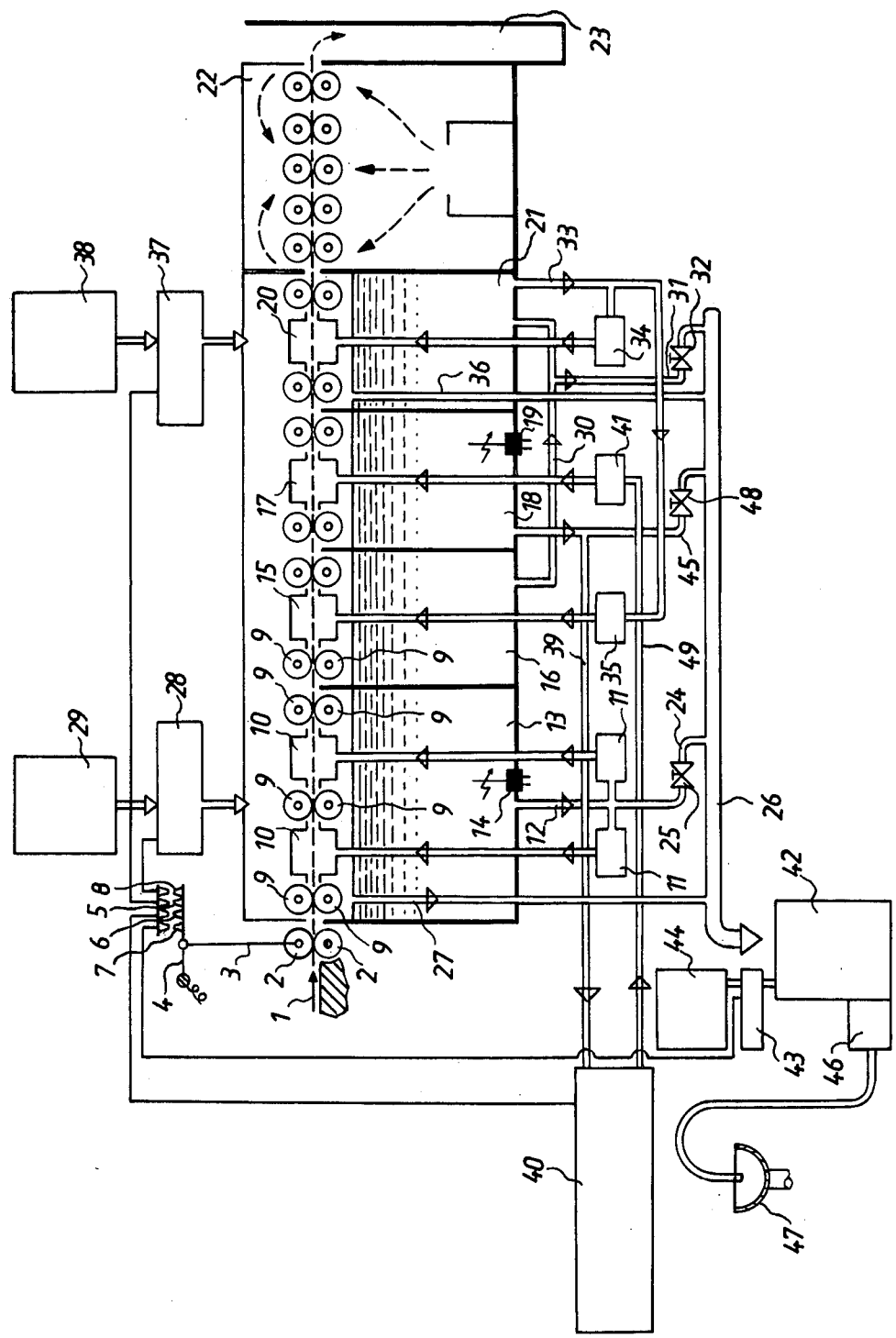

APPARATUS FOR PROCESSING PHOTOGRAPHIC FILM AND TREATING CONTAMINATED PROCESSING LIQUIDS

BACKGROUND OF THE INVENTION

The invention relates generally to the development of latent images. Of particular interest to the invention are a method and arrangement for the development of photographic images, and concomitantly, a method and arrangement for the treatment of the fluids discharged in photographic development processes.

From the German Pat. No. 1,188,822 corresponding to U.S. Pat. No. 3,463,711, is it known to continuously regenerate the fixing bath fluid used in a photographic development process by electrolytically recovering silver from the fixing fluid. The article to be fixed is immersed in the fixing bath, which latter is accommodated in a treatment vessel. The electrolytic recovery of silver is carried out in a supply vessel connected with the treatment vessel and the fixing fluid flows through the supply vessel. The intensity or duration of the electrolytic treatment is regulated in accordance with the quantity of photographic material which is passed through the treatment vessel.

The continuous removal of silver from the fixing fluid has the advantage that the fixing bath fluid practically never requires renewal since it constantly maintains its chemical activity. The process of removing silver from the fixing fluid simultaneously serves for chemically regenerating the latter.

The German Pat. No. 1,188,822 does not disclose that developer present on the articles to be immersed in the fixing bath is removed prior to such immersion and the above-described manner of recovering silver has not achieved any practical significance. The quantities of developer conveyed into the fixing bath by the articles immersed therein greatly increase the difficulty of the electrolytic regeneration if not, in fact, making this impossible.

Aside from the above problem, there exists the further problem that the fluids discharged in photographic development processes are chemically aggressive, at least to some extent. This leads to difficulties insofar as environmental pollution is concerned, particularly in view of the ever stricter requirements being imposed on the materials discharged into waterways.

It will be appreciated that improvements in the state of the art are desirable.

SUMMARY OF THE INVENTION

It is a general object of the invention to provide a novel method and arrangement for the development of latent images.

Another object of the invention is to provide a method and arrangement which enable the fixing fluid used in the development of latent images to be effectively regenerated.

A further object of the invention is to provide a method and arrangement which enable the valuable constituent or constituents of the fixing fluid used in the development of latent images to be recovered effectively and economically.

An additional object of the invention is to provide a method and arrangement which enable latent images to be developed in an economical manner.

A concomitant object of the invention is to enable the treating fluids used in the development of latent images, which fluids are chemically aggressive to at least some extent, to be treated in such a manner after their depletion, that is, when these are no longer used, that draining thereof without disadvantageous consequences for the waste water becomes possible.

These objects, as well as others which will become apparent hereinafter, are achieved in accordance with the invention. One aspect of the invention resides in a method for the development of latent images. In such a method, the invention provides for contacting an article which carries a latent image with developer fluid so as to develop the image on the article. The article is washed so as to remove at least the predominant part of the developer fluid adhering thereto. The washed article is contacted with fixer fluid so as to fix the developed image on the article. Contaminated developer fluid is treated so as to at least partially decontaminate the same. Contaminated fixer fluid is treated separately from the contaminated developer fluid so as to at least partially decontaminate the contaminated fixer fluid.

As has been indicated earlier, of particular interest to the method aspect of the invention is a method for the development of photographic images and, concomitantly, a method for the treatment of the fluids discharged in photographic development processes. Hence, the description herein will be primarily with reference to photographic development processes.

It may be mentioned here that contaminated developer fluid is developer fluid which has been contacted with an article carrying a latent image, or, on the other hand, contaminated developer fluid is also fresh developer fluid which has become mixed with developer fluid which has been contacted with an article carrying a latent image. Similarly, contaminated fixer fluid is fixer fluid which has been contacted with an unfixed or partially fixed article or, on the other hand, contaminated fixer fluid is also fresh or regenerated fixer fluid which has become mixed with fixer fluid which has been contacted with an unfixed or partially fixed article.

The operation of treating contaminated developer fluid may involve chemically neutralizing the same. On the other hand, the operation of treating contaminated fixer fluid may involve regenerating the contaminated fixer fluid and, favorably, the regeneration is carried out substantially continuously.

The developer bath and the fixing bath are accommodated in different containers and one embodiment of the invention resides in a method for the neutralization of the fluids which are discharged or which flow off in photographic development processes wherein the developer fluid which flows off is chemically neutralized separately from the fixing bath. The fixing bath fluid is treated separately and, in particular, is continuously regenerated. The article or photographic emulsion carrier to be treated is subjected to an intermediate wash between the two containers for the baths.

In accordance with the invention, the contaminated developer fluid may be collected prior to treating, e.g., neutralizing, the same. The operation of chemically neutralizing contaminated developer fluid may involve contacting the latter with a suitable substance which releases oxygen when contacted with contaminated developer fluid. Examples of substances which may be used for this purpose include hydrogen peroxide ($H_2O_2$) and acetic acid.

The developer fluid with which the photographic emulsion carrier is contacted may be supplied from a confined body of developer fluid from which contaminated developer fluid is also withdrawn for treatment or neutralization. According to the invention, regulated quantities of fresh developer fluid may be admitted into the body of developer fluid and it is of advantage here when the operation of contacting contaminated developer fluid with a chemical neutralizing substance or agent involves supplying this agent in quantities having a predetermined relationship to the quantities of fresh developer fluid admitted into the body of developer fluid.

A further embodiment of the invention resides in a method for the neutralization of the fluids which are discharged in photographic development processes wherein developer fluid flows off into a collecting vessel. The developer fluid is neutralized in the vessel by the introduction of a suitable agent such as hydrogen peroxide or acetic acid which gives off oxygen, the agent being added in a quantity which corresponds to the quantity of developer fluid dosed into the container which accommodates the developer bath.

The operation of treating contaminated fixer fluid may involve subjecting the contaminated fixer fluid to electrolysis so as to regenerate the same. It has already been mentioned that the developer fluid with which the photographic emulsion carrier is contacted may be supplied from a confined body of developer fluid from which contaminated developer fluid is also withdrawn for treatment and that, further, regulated quantities of fresh developer fluid may be admitted into the confined body of developer fluid. In accordance with the invention, the operation of subjecting contaminated fixer fluid to electrolysis may be effected at spaced time intervals of duration having a predetermined relationship to the quantities of fresh developer fluid introduced into the confined body of developer fluid.

The fixer fluid with which the photographic emulsion carrier is contacted may be supplied from a body of fixer fluid which is accommodated in a first confining space, and contaminated fixer fluid may be withdrawn from this body for regeneration. According to the invention, the regeneration or electrolysis of contaminated fixer fluid may be carried out in a second confining space which communicates with the first confining space accommodating the body of fixer fluid. Thus, contaminated fixer fluid may be conveyed from the first confining space to the second confining space for regeneration whereas regenerated fixer fluid may be conveyed from the second confining space to the first confining space for re-use.

Still another embodiment of the invention resides in a method for the neutralization of the fluids which are discharged in photographic development processes wherein the fixing bath fluid is regenerated substantially continuously. The regeneration is carried out in a vessel which is separate from the container accommodating the fixing bath and the regeneration vessel is connected with the container for the bath via a circuit. The regeneration is effected electrolytically by means of electrodes which are at least partially immersed in the fixer fluid to be regenerated. Current is supplied to the electrodes only for time intervals having a duration which correspond to the quantity of fresh developer fluid dosed into the developer bath.

In further accord with the invention, the photographic emulsion carrier may be conveyed along a predetermined path including a first section in which it is contacted with developer fluid, a second section downstream of the first section in which it is washed, and a third section downstream of the second section in which it is contacted with fixer fluid. In the first section of the path, the photographic emulsion carrier may be contacted with developer fluid supplied from a confined body of the same. Here, it is possible to admit a predetermined quantity of fresh developer fluid into the confined body in response to movement of the carrier along the path and to withdraw a quantity of contaminated developer fluid from the confined body of developer fluid in response to admission of the predetermined quantity of fresh developer fluid into the confined body. The treatment of contaminated developer fluid may also occur in response to movement of the carrier along the path. Similarly, the treatment of contaminated fixer fluid may occur in response to movement of the article along the path.

It is further possible to rinse the photographic emulsion carrier in a fourth section of its path of travel which is located downstream of the third section of the path, that is, the section wherein the carrier is contacted with fixer fluid, in order to remove at least the predominant part of the fixer fluid adhering to the carrier. The carrier may be rinsed with washing fluid supplied from a confined body of the same and, in accordance with the invention, a predetermined quantity of fresh washing fluid may be admitted into the confined body of washing fluid in response to movement of the carrier along the path. The confined body of washing fluid may include a first part arranged adjacent the second section of the path of travel of the carrier, that is, the section wherein the carrier is washed, and a second part which communicates with the first part and which is arranged adjacent the section of the path wherein the carrier is rinsed. Here, it is possible to withdraw contaminated washing fluid from the second part of the confined body of washing fluid, that is, the part arranged adjacent the section of the path wherein the carrier is rinsed, in response to raising of the level of the confined body of washing fluid above a predetermined level. The withdrawn contaminated washing fluid may be treated so as to at least partially decontaminate the same.

The washing and/or rinsing of the photographic emulsion carrier may involve contacting the carrier with an acidified medium. An example of a suitable acidified medium is one which includes acetic acid.

By virtue of the intermediate wash according to the invention to which the photographic emulsion carrier is subjected between the container accommodating the developer bath and the container accommodating the fixing bath, it becomes feasible to make the dragging or conveying of developer into the fixing bath practically impossible. On the one hand, this enables a constant regeneration of the fixing bath by electrolytic recovery of, for instance, the silver, contained in the fixing bath to be achieved while, on the other hand, making possible a chemical neutralization of excess quantities of developer by the addition of simple neutralizing agents, for example, neutralizing agents of simple type such as hydrogen peroxide ($H_2O_2$) and acetic acid which release oxygen. The mixture of neutralized developer and excess washing fluid, e.g., wash water, which flows off, and which may also contain small residual quantities of fixing bath fluid, is chemically neutral and, consequently, is completely harmless for waste water.

Another aspect of the invention resides in an arrangement for the development of latent images. In such an arrangement, the invention provides a combination which comprises means for contacting an article which carries a latent image with developer fluid so as to develop the latent image on the article. Means for washing the article so as to remove at least the predominant part of the developer fluid adhering thereto is also provided as is means for contacting the washed article with fixer fluid so as to fix the developed image on the article. The novel arrangement further includes means for treating contaminated developer fluid so as to at least partially decontaminate the same and means for treating contaminated fixer fluid separately from contaminated developer fluid so as to at least partially decontaminate the contaminated fixer fluid. The arrangement according to the invention is particularly well-suited for carrying out the method in accordance with the invention.

As indicated previously, of particular interest to the apparatus aspect of the invention is an arrangement for the development of photographic images and, concomitantly, an arrangement for the treatment of the fluids discharged in photgraphic development processes. Accordingly, the description of the apparatus aspect of the invention will also be primarily with reference to photographic development processes.

The means for contacting the article or photographic emulsion carrier with developer fluid may include a container or vessel for accommodating a developer bath. Means may be provided for admitting fresh developer fluid or developer regenerate into the container for the developer bath and this admitting means may include a storage vessel or source of fresh developer fluid or developer regenerate. The washing means for removing developer fluid adhering to the photographic emulsion carrier may also comprise a container or vessel for accommodating washing fluid. Similarly, the means for contacting the washed article with fixer fluid may include a container or vessel for accommodating a fixing bath. The means for treating contaminated fixer fluid may be in the form of regenerating means which may include a container or vessel and electrodes arranged in the container.

The arrangement according to the invention may further comprise rinsing means for removing at least the predominant part of the fixer fluid adhering to the photographic emulsion carrier, and an additional container or vessel for washing fluid may be provided. Means may also be provided for admitting fresh washing fluid such as, for instance, fresh water, into one or both of the containers for washing fluid. A preferred embodiment of the invention contemplates admitting means for admitting fresh washing fluid into one of these containers, that is, either the container associated with the washing means or the container associated with the rinsing means. Advantageously, the admitting means introduces an acidified medium as fresh washing fluid and it is particularly favorable for the acidified medium to be in the form of fresh water which has been acidified with acetic acid.

A dosing or regulating device may be associated with the means for admitting fresh developer fluid or developer regenerate into the container for the developer bath so that regulated quantities of fresh developer fluid may be introduced into the latter. Similarly, a dosing or regulating device may be associated with the means for admitting fresh washing fluid into a container for washing fluid so that regulated quantities of fresh washing fluid may be introduced into the latter.

A preferred embodiment of the invention contemplates for the arrangement to be constructed for continuous passage therethrough of the photographic emulsion carrier. In other words, it is favorable for the arrangement to include means for conveying the carrier along a predetermined path including a first section or station for contacting the carrier with developer fluid, a second section or station downstream of the development station for washing the article so as to remove developer fluid adhering thereto and a third section or station downstream of the washing station for contacting the carrier with fixer fluid. A fourth section or station may also be present downstream of the fixing station for rinsing the carrier so as to remove fixer fluid adhering thereto or to subject the carrier to a final wash.

Advantageously, sensing or detecting means is arranged in the path of travel of the photographic emulsion carrier for sensing or detecting the size of the carrier and, preferably, for sensing the length of the carrier. The sensing means emits a suitable form of signal which, in its duration, corresponds to the length of the moving carrier. The sensing means is capable of activating a signal transmitter which, in turn, is connected with the admitting means for fresh developer fluid, the admitting means for fresh washing fluid and the electrodes for regenerating contaminated fixer fluid. Thus, the sensing means is operatively associated with the admitting means for fresh developer fluid, the admitting means for fresh washing fluid and the electrodes for regenerating contaminated fixer fluid. In this manner, the signal transmitter and the sensing means may regulate the admission of fresh developer fluid into the container with the developer bath, the admission of fresh washing fluid into a container with washing fluid and the flow of current to the electrodes in the fixer fluid regenerating container.

A further embodiment of the invention provides for the containers which accommodate the washing fluid to be connected by means of at least one conduit. Advantageously, these containers are connected via two conduits. A pump may be provided in one of these conduits for conveying washing fluid between the containers or for recycling washing fluid between the containers.

Another embodiment of the invention provides for each wet treatment station, that is, the development station, the washing station, the fixing station and the rinsing station, to include at least one pressure chamber or contacting chamber through which the photographic emulsion carrier passes and wherein it is contacted with the respective fluid. Preferably, the chambers are arranged in such a manner that the carrier passes directly therethrough, that is, travels therethrough along a substantially straight line. A pump may be associated with each contacting chamber for conveying the respective fluid therein for contact with the carrier. Advantageously, the pump for conveying washing fluid into the contacting chamber associated with the washing station, that is, the station between the development and fixing stations, is arranged in one of the conduits which connect the containers accommodating the washing fluid. This pump may be the same one as that which serves to recycle washing fluid between the containers accommodating the washing fluid.

The container associated with the fixing station and which accommodates the fixing bath may be connected with the regeneration container for regenerating contaminated fixer fluid via two conduits. One of these conduits may serve to convey contaminated fixer fluid from the container with the fixing bath to the regeneration container whereas the other of the conduits may serve to convey regenerated fixer fluid from the regeneration container to the container with the fixing bath. Advantageously, the pump for conveying fixer fluid into the contacting chamber of the fixing station is arranged in one of these conduits.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE schematically represents one form of an arrangement according to the invention which may be used for carrying out the method of the invention.

DESCRIPTION OF THE PREFERRED EMBODIMENTS

With reference to the FIGURE, this is assumed here to illustrate a photographic development arrangement and, as will become clearer as the description proceeds, the associated subassemblies for the treatment or decontamination of excess or discharged fluids are also illustrated.

The reference numeral 1 indicates an article which carries a latent image and which travels in the direction shown by the arrow. The article 1 is here assumed to be a photographic film.

The film 1 is conveyed towards a pair of feed rollers 2 which are arranged in the region of the entrance of a photographic development apparatus. The lower roller 2 of this pair of feed rollers is mounted in such a manner that it cannot undergo translational movement relative to the arrangement. In contrast, the upper roller 2 of the pair of feed rollers is not mounted so as to prevent translational movement thereof relative to the arrangement. Rather, the upper roller 2 is mounted so as to be upwardly displaceable against the force of a spring or against its own weight.

The upper roller 2 of the pair of feed rollers is connected with a push rod 3 which, in turn, is connected with a lever 4. Thus, an upward motion of the upper roller 2 is transmitted to the lever 4 via the rod 3. The lever 4 is secured in the region of one of its ends so that it cannot undergo translational motion relative to the arrangement. In the region of the other end thereof, which latter end is not secured, the lever 4 is provided with a plurality of activating projections or contacts 5, 6, 7 and 8. A set of contacts corresponding in number to those provided on the lever 4 is fixedly mounted above the end of the lever 4 provided with the contacts 5, 6, 7 and 8. When the upper roller 2 of the pair of feed rollers is raised by conveying the photographic emulsion carrier or film 1 between the rollers 2, each of the contacts 5, 6, 7 and 8 of the lever 4 is caused to abut one of the fixedly mounted contacts. Each of the abutting pairs of contacts closes an electrical circuit.

In direct linear continuation of the path of the film 1 beyond the pair of feed rollers 2 there are arranged a plurality of pairs of transport rollers 9. Between certain ones of the pairs of transport rollers 9 there are provided pressure or contacting chambers 10, 15, 17 and 20. The pressure chambers 10, 15, 17 and 20 are provided for the purpose of treating or contacting the moving film 1 with the appropriate treating fluid and may be constructed approximately in accordance with the teachings of the German patent application P 19 62 422.7, corresponding to U.S. Pat. No. 3,688,677.

Pumps 11, 35, 41 and 34 are provided for forcing treating fluid into the pressure chambers 10, 15, 17 and 20, respectively. The pumps 11 and 41 are respectively connected with receiving containers or vessels 13 and 18 whereas, as will be more fully described hereafter, the pumps 35 and 34 are each connected with receiving containers or vessels 16 and 21. It may be seen that the containers 13, 16, 18 and 21 are arranged below the pressure chambers 10, 15, 17 and 20, respectively. The containers 13, 16, 18 and 21 accommodate the various treating fluids. The pumps 11 and 41 may cause treating fluid to be withdrawn from the respective containers 13 and 18 by suction and, concomitantly, may convey treating fluid into the pressure chambers 10 and 17, respectively. The pumps 35 and 34 may cause treating fluid to be withdrawn from the containers 16 and 21 by suction and, concomitantly, may convey treating fluid into the pressure chambers 15 and 20, respectively. The connection between the pumps 11 and 41 and the respective containers 13 and 18, as well as the connection between the pumps 35 and 34 and the containers 16 and 21, may be via suitable suction conduits or hoses.

The container 13 accommodates developer fluid. A temperature control device 14 is arranged in the container 13 so that the temperature of the developer fluid may be thermostatically controlled. It may be seen that, in the illustrated embodiment, two pressure chambers 10 are arranged above the container 13 for developer fluid.

The container 16 accommodates washing fluid and it will be seen that the container 16 for washing fluid is arranged downstream of the container 13 for developer fluid. Concomitantly, the pressure chamber 15 arranged above the container 16 for washing fluid is located downstream of the two pressure chambers 10 arranged above the container 13 for developer fluid.

The container 18 accommodates fixer fluid and it may be seen that this container is arranged downstream of the container 16 for washing fluid. Likewise, the pressure chamber 17 above the container 18 for fixer fluid is located downstream of the pressure chamber 15 arranged above the container 16 for washing fluid. A temperature control device 19 is provided in the container 18 for fixer fluid so that the temperature of the fixer fluid may be thermostatically controlled.

It will be appreciated that the pressure chamber 15 serves for subjecting the film 1 to an intermediate wash before the film 1 enters the pressure chamber 17 in which it is treated with fixer fluid. In other words, the pressure chamber 15 serves to wash off developer fluid adhering to the film 1 prior to entry of the film 1 into the pressure chamber 17 for treatment with fixer fluid. The fixer fluid which flows out of the pressure chamber 17 is caught up or collected in the container 18.

The container 21 also accommodates washing fluid and this container is located downstream of the container 18 for fixer fluid. Concomitantly, the pressure chamber 20 arranged above the container 21 for washing fluid is located downstream of the pressure chamber 17 arranged above the container 18 for fixer fluid. The pressure chamber 20 is impinged with washing fluid, e.g., water. Thus, subsequent to passing through the pressure chamber 17 having fixer fluid, the film 1 travels into the pressure chamber 20 arranged above the container 21 for washing fluid where it is subjected to a final wash or rinse, that is, where it is washed so as to remove fixer fluid adhering thereto. A suitable squeezing device or suitable squeezing rollers may be arranged downstream of the pressure chamber 20 and the container 21 for washing fluid and, downstream of the squeezing device or rollers, there is provided a drying arrangement 22 of known construction. A chute or catch basin 23 for films whose treatment has been completed is arranged at the outlet or downstream side of the drying arrangement 22.

It will be seen that one pump 11 is provided for each of the pressure chambers 10 arranged above the container 13 for developer fluid. The two pumps 11 for the introduction of developer fluid into the chambers 10 are connected to a common suction conduit or hose 12. The suction conduit 12 further communicates with an outlet conduit 24 which is provided with a valve 25. The outlet conduit 24 opens into an outflow collection conduit 26 which, in turn, leads to a collecting vessel 42. The outlet conduit 24 and the valve 25 enable the contents of the container 13 for developer fluid to be emptied into the outflow conduit 26 when desired.

In the container 13 for developer fluid, there is further provided an overflow conduit 27 which makes it impossible for the level of fluid to rise above a predetermined height. Any fluid in the container 13 for developer fluid which exceeds this predetermined height flows directly to the outflow conduit 26 via the overflow conduit 27.

A dosing or regulating device 28 communicates with the container 13 for developer fluid and the dosing device 28 is, in turn, connected with a supply vessel or container 29 for fresh developer fluid or developer fluid regenerate. The dosing device 28 is effective for admitting fresh developer fluid or developer fluid regenerate into the container 13 from the supply vessel 29 in a quantity which corresponds to the surface area of the film 1 travelling through the arrangement, that is, in a quantity which corresponds to the average quantity of chemicals used up by the film 1. Here, the contact 8 activated by the upper roller 2 of the pair of feed rollers 2 sends a signal to the dosing device 28 which is representative of the length of the film 1 travelling through the arrangement. Since the most diverse forms of dosing devices such as the dosing device 28 have become known, a description of the construction of the dosing device 28 would be superfluous here.

The two containers 16 and 21 for washing fluid are connected via a conduit 30. A branch conduit 31, provided with a valve 32, branches off from the connecting conduit 30 and leads from the latter to the outflow conduit 26. The branch conduit 31 and the valve 32 enable the containers 16 and 21 for washing fluid to be completely emptied into the outflow conduit 26 when desired.

A suction conduit 33 communicates with the container 21 for washing fluid. On the one hand, the suction conduit 33 branches off to the pressure pump 34 which delivers washing fluid to the washing chamber 20 so that the pump 34 may be supplied with washing fluid. On the other hand, the suction conduit 33 branches off to the pump 35 which delivers washing fluid to the intermediate washing chamber 15 so that the pump 35 may be supplied with washing fluid. The washing fluid may, for instance, contain or consist essentially of water. It will be seen that the suction conduit 33 and the branch thereof in which the pump 35 is arranged provide an additional connection between the containers 16 and 21 for washing fluid. By virtue of the provision of the pump 35 in a connection between the containers 16 and 21 for washing fluid, a flow circuit is established between the containers 16 and 21. Thus, the fluid delivered into the washing chamber 15 by the pump 35 flows out of the washing chamber 15 into the container 16. This causes the level of fluid in the container 16 to rise and the increased fluid level in the container 16 results, in turn, in the flow of fluid from the container 16 to the container 21 via the connecting conduit 30. In turn, the pump 35 again sucks fluid out of the container 21.

In the container 21 for washing fluid, there is further provided an overflow conduit 36 which prevents a rise in the level of fluid in this container beyond a certain point. The overflow conduit 36 communicates with the outflow conduit 26 so that washing fluid which rises above the predetermined level set by the overflow conduit 36 may be discharged into the outflow conduit 26.

A dosing or regulating device 37 is arranged above the container 21 for washing fluid. The dosing device 37 is, in turn, connected with a supply vessel or container 38 for fresh washing fluid, e.g., water. The dosing device 37 is effective for introducing fresh washing fluid from the supply vessel 38 into the container 21 in a quantity which corresponds to the time interval for which the contact 5 closes an electrical circuit in cooperation with its corresponding contact, that is, in a quantity which corresponds to the time required for the travelling film 1 to pass between the pair of feed rollers 2. Concomitantly, a volume of washing fluid equivalent to that introduced into the container 21, and which has been enriched or contaminated with chemicals, flows out of the container 21 into the outflow conduit 26 via the overflow conduit 36. The fresh washing fluid admitted into the container 21 from the supply vessel 38 may be acidified. Advantageously, the fresh washing fluid is in the form of fresh water which has been slightly acidified by the addition of a predetermined quantity of acetic acid, for example. Of significance here is the fact that, by virtue of the connection between the two containers 16 and 21 for washing fluid, small residual quantities of fixer fluid and acetic acid are admitted into the container 16 and the washing chamber 15 wherein the film 1 is washed to remove developer fluid adhering thereto. Thus, the residual developer fluid adhering to the film 1 is not only greatly diluted by washing in the washing chamber 15 but is also chemically neutralized so that no significant quantities of developer fluid are able to be transmitted into the fixing bath or the container 18 for fixer fluid. In this manner, the effective life of the fixer fluid in the container 18, that is, the length of time for which the fixer fluid may be used, is further increased.

A conduit 45, provided with a valve 48, communicates with the container 18 for fixer fluid and leads from the container 18 to the outflow conduit 26. The conduit 45 and the valve 48 make it possible to empty out the contents of the container 18 for fixer fluid into the outflow conduit 26 when desired.

An outlet conduit 39 branches off from the conduit 45 and leads to a regeneration vessel or chamber 40 so that the container 18 for fixer fluid is in communication with the regeneration chamber 40 via the outlet conduit 39. An electrolyzing arrangement, for instance, in the form of electrodes, is provided in the regeneration chamber 40 and the electrolyzing arrangement may be approximately in accordance with the teachings of the abovereferenced German Pat. No. 1,188,822. The electrolyzing arrangement enables the silver contained in the fixer fluid to be recovered therefrom and to be electrolytically deposited on the electrodes. The pump 41, which delivers fluid into the pressure chamber 17 wherein the fixer fluid is utilized, draws fluid from the regeneration chamber 40 via a conduit 49. The supply of current to the electrodes in the regeneration chamber 40 is controlled by means of the contact 6 which, in cooperation with its corresponding contact, closes an electrical circuit when the upper roller 2 of the pair of feed rollers 2 is lifted in response to passage of the film 1 between the pair of feed rollers 2. The supply of current to the electrodes is set to a value such that a current density which is suitable for the treatment or decontamination of the fixer fluid is obtained, for instance, a current density of about 50 milliampers per square decimeter.

The outflow collection conduit 26 leads to a collecting vessel or container 42 as indicated earlier. A dosing or regulating device 43 communicates with the collecting vessel 42 and the dosing device 43 is further connected with a supply vessel or container 44 for accommodating chemicals for neutralization of the developer fluid. The dosing device 43 supplies chemicals from the supply vessel 44 into the collecting vessel 42 in dependence upon signals received from the contact 7. In other words, each time that a certain quantity of developer fluid is admitted into the container 13 for developer fluid via the dosing device 28, a corresponding volume of partially used or contaminated developer fluid flows into the collecting vessel 42 via the overflow conduit 27 and, further, the quantity of neutralizing agent required to neutralize this quantity of partially used or contaminated developer fluid is admitted into the collecting vessel 42 from the supply vessel 44. The neutralizing agent may, for instance, be concentrated acetic acid or hydrogen peroxide.

A pump 46 is also provided. The pump 46 may, for instance, be controlled by means of a floating switch or valve arranged in the collecting vessel 42. The pump 46 serves to pump the contents of the collecting vessel 42 into an outflow conduit 47 subsequent to neutralization of the contents of the collecting vessel 42. As a consequence, the arrangement does not require an outlet at the ground or floor level.

The operation of the arrangement described is readily apparent. In the starting condition, all of the containers 13, 16, 18 and 21 are filled with the respective treating fluids to the indicated levels. The treating fluids possess the normal activity associated with their concentrations. If now a photographic emulsion carrier is conveyed between the pair of feed rollers 2, the contacts 5, 6, 7 and 8 are simultaneously activated and remain in this condition for the duration of the passage of the carrier through the pair of feed rollers 2. This means that a measured quantity of fresh developer fluid or developer regenerate, that is, a fluid having a higher concentration of active substances than that in the container 13, is admitted into the container 13 for developer fluid whereas a corresponding volume of developer fluid having a lower activity flows into the collecting vessel 42 via the overflow conduit 27 and the outflow conduit 26. Simultaneously, a corresponding quantity of fresh washing fluid is introduced into the container 21 for washing fluid so that a corresponding volume of washing fluid having a low impurity content of fixer fluid likewise flows into the collecting vessel 42. At the same time, the electrolysis of the fixer fluid in the regeneration chamber 40 is set into progress by the contact 6 and continues for the duration of the activation of this contact. Thus, a quantity of silver corresponding to the average quantity of silver to be removed from a photographic emulsion carrier or film having the same length as that passing between the pair of feed rollers 2 is electrolytically separated out in the regeneration chamber 40 and, hence, the activity of the fixing bath in the container 18 for fixer fluid may remain substantially constant also after the passage of the photographic emulsion carrier passing between the pair of feed rollers 2. This may be regulated by the size of the electrodes and the electrolyzing potential or voltage. In addition to the above, a quantity of neutralizing agent requisite for the neutralization of the developer fluid which has flowed out of the container 13 for developer fluid is admitted into the collecting vessel 42.

It will be understood that the valves 24, 31 and 48 are normally closed during operation.

By separating the outflow of fixer fluid and developer fluid, it becomes possible to effect a neutralization with cheaper and simpler chemicals, and also smaller quantities of chemicals, than would be required if these two constituents flowed off together. Furthermore, by virtue of the continuing regeneration of the fixer fluid, a neutralization of the fixing bath does not become necessary at all except after an extended time period such as, for instance, a year, when all of the containers 13, 16, 18 and 21 should be emptied. Even here, a neutralization by means of the arrangement which includes the collecting vessel 42 is possible. In such an event, an additional quantity of neutralizing agent should be admitted into the collecting vessel 42 via the dosing device 43, for example, by manipulating the dosing device 43 by hand. Moreover, the connection between the two containers 16 and 21 for washing fluid which are provided for intermediate washing and final washing of photographic emulsion carriers makes possible a slight acidification of the bath for the intermediate wash by virtue of both fixer fluid which is dragged into the washing fluid and the introduction of additional quantities of acid. This may be accomplished without requiring the employment of expensive measures. Also, the acidification of the washing fluid further improves the effectiveness of the intermediate wash. The waste water problem is also completely solved with minimum expenditure in accordance with the invention. Furthermore, the silver freed during the photographic development process is practically completely recovered.

Instead of the electrolytic separation of silver from the fixer fluid, a substitute process may be used such as, for instance, one employing steel wool cartridges. Here, however, the fixer fluid which has been freed from silver should not be constantly recycled but, rather, due to its iron content, should be utilized only in limited quantities together with fresh fixer fluid regenerate if it is desired to re-use the fixer fluid which has been freed from silver.

It will be self-understood that the method described for the preparation of waste water may also find application in conjunction with development arrangements having a different construction. For example, the method may find application in development arrangements wherein the photographic emulsion carrier travels through the treatment chambers in a curved, U-shaped path.

It will be understood that each of the elements described above, or two or more together, may also find a useful application in other types of methods and arrangements differing from the types described above.

While the invention has been illustrated and described as embodied in a method and arrangement for use in photographic development processes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention.

What is claimed as new and desired to be protected by Letters Patent is set forth in the appended claims.

1. An arrangement for the development of latent images, comprising means for conveying an article which carries a latent image along a predetermined path including a first section for contacting said article with developer fluid, a second section downstream of said first section for washing said article, and a third section downstream of said second section for contacting said article with fixer fluid; means for detecting the movement of said article along said path; means for contacting said article with developer fluid so as to develop the latent image on said article; means for washing said article so as to remove at least the predominant part of the developer fluid adhering thereto; means for contacting the washed article with fixer fluid so as to fix the developed image on said article; rinsing means downstream of said means for contacting said article with fixer fluid, said rinsing means including container means for accommodating a body of washing fluid into said container means, said admitting means being effective for admitting an acidified medium into said container means, and said admitting means being operatively associated with said detecting means so that fresh washing fluid is admitted into said container means in response to a signal from said detecting means; means for chemically neutralizing contaminated developer fluid; and means for treating contaminated fixer fluid separately from contaminated developer fluid so as to at least partially decontaminate said contaminated fixer fluid.

2. An arrangement as defined in claim 1, wherein said admitting means is effective for admitting aqueous acetic acid into said container means.

3. An arrangement for the development of latent images, comprising means for conveying an article which carries a latent image along a predetermined path including a first section for contacting said article with developer fluid, a second section downstream of said first section for washing said article, and a third section downstream of said second for contacting said article with fixer fluid; means for detecting the movement of said article along said path; means for contacting said article with developer fluid so as to develop the latent image on said article; means for washing said article so as to remove at least the predominant part of the developer fluid adhering thereto; means for contacting the washed article with fixer fluid so as to fix the developed image on said article; means for chemically neutralizing contaminated developer fluid and means for treating contaminated fixer fluid separately from contaminated developer fluid so as to at least partially decontaminate said contaminated fixer fluid, said fixer fluid treating means comprising electrode means for regenerating contaminated fixer fluid, and said electrode means being operatively associated with said detecting means so that current is supplied to said electrode means in response to a signal from said detecting means.

4. An arrangement for the development of latent images, comprising means for contacting an article which carries a latent image with developer fluid so as to develop the latent image on said article; means for washing said article so as to remove at least the pedominant part of the developer fluid adhering thereto; means for contacting the washed article with fixer fluid so as to fix the developed image on said article; means for chemically neutralizing contaminated developer fluid; means for treating contaminated fixer fluid separately from contaminated developer fluid so as to at least partially decontaminate said contaminated fixer fluid; means for conveying said article along a predetermined path including a first section for contacting said article with developer fluid, a second section downstream of said first section for washing said article, and a third section downstream of said second section for contacting said article with fixer fluid; means for detecting the movement of said article along said path; rinsing means downstream of said means for contacting said article with fixer fluid, said rinsing means including container means for accommodating a body of washing fluid; and means for admitting regulated quantities of fresh washing fluid into said container means, said admitting means being operatively associated with said detecting means so that fresh washing fluid is admitted into said container means in response to a signal from said detecting means, said means for contacting said article with developer fluid comprising developer container means for accommodating a body of developer fluid, and said fixer fluid treating means comprising electrode means for regenerating contaminated fixer fluid, said detecting means being effective for sensing the sizes of articles in a direction along said path; and wherein additional admitting means is provided for admitting regulated quantities of fresh developer fluid into said container means, said additional admitting means being operatively associated with said detecting means so that fresh developer fluid is admitted into said developer container means in response to a signal from said detecting means, and said electrode means also being operatively associated with said detecting means so that current is supplied to said electrode means in response to a signal from said detecting means.

* * * * *